US010635777B2

(12) United States Patent
Koppauer

(10) Patent No.: US 10,635,777 B2
(45) Date of Patent: Apr. 28, 2020

(54) METHOD FOR GENERATING AND USING A TWO-DIMENSIONAL DRAWING HAVING THREE-DIMENSIONAL ORIENTATION INFORMATION

(71) Applicant: Bayerische Motoren Werke Aktiengesellschaft, Munich (DE)

(72) Inventor: Josef Koppauer, Landshut (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 503 days.

(21) Appl. No.: 15/045,036

(22) Filed: Feb. 16, 2016

(65) Prior Publication Data

US 2017/0235870 A1    Aug. 17, 2017

(51) Int. Cl.
*G06F 17/50* (2006.01)
*G06T 19/20* (2011.01)
(Continued)

(52) U.S. Cl.
CPC ........ *G06F 17/5095* (2013.01); *G06T 3/0031* (2013.01); *G06T 11/20* (2013.01);
(Continued)

(58) Field of Classification Search
CPC .. G06F 17/5095; G06F 2217/12; G06T 11/20; G06T 19/20; G06T 3/0031; G06T 2219/021
See application file for complete search history.

(56) References Cited

U.S. PATENT DOCUMENTS 5,506,950 A * 4/1996 Hughes .................. G06T 17/00
                                                345/420
5,610,454 A * 3/1997 Nishikawa .......... B60R 16/0207
                                                174/72 A
(Continued)

FOREIGN PATENT DOCUMENTS

JP    2006-155060    *  6/2006    ............. G06F 17/50
JP    2009258952     * 11/2009
(Continued)

OTHER PUBLICATIONS

"Electrical Harness Flattening Users Guide" Version 5, Release 20 (2009), Section "General Parameters": Dassault Systems [retrieved on Mar. 19, 2018]. Retreived from <http://catiadoc.free.fr/online/CATIAfr_C2/ehfugCATIAfrs.htm>.*
(Continued)

*Primary Examiner* — Rehana Perveen
*Assistant Examiner* — Alfred H B Wechselberger
(74) *Attorney, Agent, or Firm* — Crowell & Moring LLP

(57) ABSTRACT

A two-dimensional drawing of a three-dimensional wire harness model is generated by selecting a starting node from a plurality of nodes of the three-dimensional wire harness model, where the starting node is directly connected to a first bundle and a second bundle of the plurality of bundles, wherein further each of the first and second bundles are representable by corresponding first and second vectors. A reference plane is defined based on an orientation of the starting node, the first vector and the second vector, such that a first adjacent node may then be mapped onto the reference plane by geometric translation. Thereafter, a plurality of mapping operations are sequentially carried out until each of the plurality of nodes and the plurality of bundles have been mapped, by geometric translation, to the reference plane, and wherein corresponding translation matrices are stored in association with corresponding ones of the plurality of
(Continued)

mapped nodes and/or the plurality of mapped bundles. The two-dimensional drawing of the three-dimensional wire harness model may then be generated such that the two-dimensional drawing includes three-dimensional orientation data corresponding to the plurality of bundles.

18 Claims, 4 Drawing Sheets

(51) Int. Cl.
    *G06T 11/20*    (2006.01)
    *G06T 3/00*    (2006.01)

(52) U.S. Cl.
    CPC .......... *G06T 19/20* (2013.01); *G06F 2217/12* (2013.01); *G06T 2219/021* (2013.01)

(56) References Cited

U.S. PATENT DOCUMENTS

| | | | | |
|---|---|---|---|---|
| 7,024,341 | B2* | 4/2006 | Barrow | G06F 17/5095 29/872 |
| 7,383,162 | B2* | 6/2008 | Hashima | B60R 16/0207 703/2 |
| 8,411,090 | B2* | 4/2013 | Wang | G06T 19/00 345/427 |
| 2006/0241896 | A1* | 10/2006 | Sawai | B60R 16/0207 702/151 |
| 2007/0247456 | A1* | 10/2007 | Yvon | B60R 16/0207 345/419 |
| 2007/0255544 | A1* | 11/2007 | Yvon | B60R 16/0215 703/7 |
| 2010/0070243 | A1* | 3/2010 | Yvon | G06F 17/509 703/1 |
| 2015/0339850 | A1* | 11/2015 | Utsugi | G06T 13/40 345/420 |

FOREIGN PATENT DOCUMENTS

| | | | | |
|---|---|---|---|---|
| JP | 004886478 | B2 * | 2/2012 | |
| WO | WO2012/166982 | * | 6/2012 | G06F 17/30 |

OTHER PUBLICATIONS

"CATIA V5—Electrical Wire Harness Flattening (HFX)" [video] (2011): uploaded by uniplm [retrieved on Mar. 23, 2018]. Retrieved from <https://www.youtube.com/watch?v=SbzpQ4w7lrs>.*

Rice et al. "Comparing Three Task Guidance Interfaces for Wire Harness Assembly" CHI '16 Extended Abstracts, May 2016, San Jose, CA: ACM 978-1-4503-4082-3/16/05 [retrieved on Oct. 8, 2018]. Retrieved from <https://dl.acm.org/citation.cfm?id=2892347> (Year: 2016).*

Rice et al. "[POSTER] Augmented Wire Routing Navigation for Wire Assembly" 2015 IEEE International Symposium on Mixed and Augmented Reality (ISMAR).nbsp;doi: 10.1109/ISMAR.2015.28 [received from Oct. 8, 2018]. Retrieved from <https://oar.a-star.edu.sg/jspui/handle/123456789/1559> (Year: 2015).*

* cited by examiner

PRIOR ART

METHOD FOR GENERATING AND USING A TWO-DIMENSIONAL DRAWING HAVING THREE-DIMENSIONAL ORIENTATION INFORMATION

FIELD OF THE INVENTION

The present invention relates in general to vehicle wiring harness design and production, and more particularly to a novel approach for generating a two-dimensional drawing that incorporates three-dimensional orientation data from a three-dimensional model of the given wire harness.

BACKGROUND OF THE INVENTION

It is generally known that vehicle wiring harnesses are very complex and cumbersome to modify. The wiring harness design and development process begins with development of individual components (e.g., control devices, sensors, actuators, connectors, accessories, etc.), followed by the development of a system circuit plan and a wiring plan.

At that point, a new or modified vehicle harness is ready to be represented in a three-dimensional geometry. This three-dimensional geometry is important for defining the installation space for the various components and the wire harness, for selecting and positioning suitable mounting elements (shafts, grommets, clips, etc.) and for defining the bundle lengths for later conversion into a two-dimensional drawing.

The three-dimensional geometry may be generated using commercially available modeling software, such as CATIA V5, in the form of a wire harness box (WHB) package. The WHB package refers to the virtual, geometric three-dimensional depiction of all wire bundles and components that comprise a particular vehicle wire harness.

One of the uses of the three-dimensional WHB package is the generation of a two-dimensional computer aided design (CAD) drawing, which encompasses all geometrically-relevant components (e.g., connector housing, ring terminals (eyelets), connectors, accessories, mounting parts, wiring protection, and accessory parts; referencing is generally done via a occurrence ID and part number), as well as length tolerances, geometric variances, and much more. Much of the actual design, engineering, pre-production, and bills of material are all completed using such a separate two-dimensional drawing, as opposed to the more cumbersome three-dimensional model.

While the content for the two-dimensional drawing is largely derived from the three-dimensional WHB package, it must generally be supplemented with additional information (e.g. connectors, routing points, parameters about the type of winding to be performed, production notes, length tolerances, etc.) which is lost during the conversion process. As such, the generation of the two-dimensional drawing is labor intensive, being manually created from the aforementioned three-dimensional WHB package. For example, cable lengths and positioning points from mounting parts (e.g., clips, holders, grommets, shafts) must be measured in the three-dimensional model and manually transferred to the two-dimensional model.

Other manual additions that the developer/wire harness designer must make to the two-dimensional drawing vs. the three-dimensional model include specified bundle lengths, minimum lengths in dimensional chains and length tolerances, rough drawing of the connections, orientation of mounting parts (sectional views), location of connectors (splices), winding types (incl. cross-winding and bindings), etc.

Beyond the above, one of the most labor intensive steps to wires harness design is the need to disentangle (or unwind) the two-dimensional drawing in order for it to be usable in connection with the aforementioned design, engineering and pre-production processes, as well as template for the formboard drawing, which is needed or manufacturing. This additional manual step is required because available CAD tools are able to generate the two-dimensional drawing from the three-dimensional model by setting one coordinate (usually the Z-coordinate, possibly the y coordinate mainly in the case of door wiring harnesses) to "0," thus causing the cable to fall into the resulting plane in a manner similar to a projection. The net effect of this, as shown in FIG. 1, is that the information about the outgoing direction of the bundles at the nodes is lost. Thus, in the resulting two-dimensional plane, the bundles, which typically lie one above another in the actual physical implementation, are required to be unwound or disentangled by the designer for the drawing to be further usable, as noted above. This involves having to manually stretch and orient the two-dimensional bundles, which is a laborious process.

As such, there is a need in the art for an improved approach for eliminating the need to minimize the labor required to unwind or disentangle two-dimensional wiring harness drawings which are based on three-dimensional wire harness models.

BRIEF SUMMARY OF THE INVENTION

Disclosed and claimed herein are computer-implemented methods and computer program products for generating a two-dimensional drawing of a vehicle wiring harness. In one embodiment, a computer-implement method for generating a two-dimensional drawing of a three-dimensional wire harness model comprises selecting a starting node from a plurality of nodes of the three-dimensional wire harness model, wherein the starting node is directly connected to a first bundle and a second bundle of a plurality of bundles, wherein further each of the first and second bundles are representable by corresponding first and second vectors. The method includes defining a reference plane based on an orientation of the starting node, the first vector and the second vector, and then mapping a first adjacent node onto the reference plane by geometric translation, wherein the first adjacent node is adjacent to and directly connected to the starting node by the first bundle.

The computer-implement method further includes mapping a first adjacent vector by geometric translation onto the reference plane with an orientation that is parallel and opposite to the first vector, wherein the first adjacent vector corresponds to the first bundle, mapping the first bundle onto the reference plane with its true length based on the first vector of the starting node and the first adjacent vector of the first adjacent node, and storing a translation matrix, corresponding to said mapping of the first bundle, in association with at least one of the mapped first adjacent node and the mapped first bundle.

According to the method, mapping operations may be repeated until each of the plurality of nodes and the plurality of bundles have been mapped, by geometric translation, to the reference plane, and wherein corresponding translation matrices are stored in association with corresponding ones of the plurality of mapped nodes and/or the plurality of mapped bundles. Thereafter, the two-dimensional drawing of the three-dimensional wire harness model may be generated, wherein the two-dimensional drawing comprises three-dimensional orientation data corresponding to said plurality of bundles.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview of the Disclosure

Figure 1:
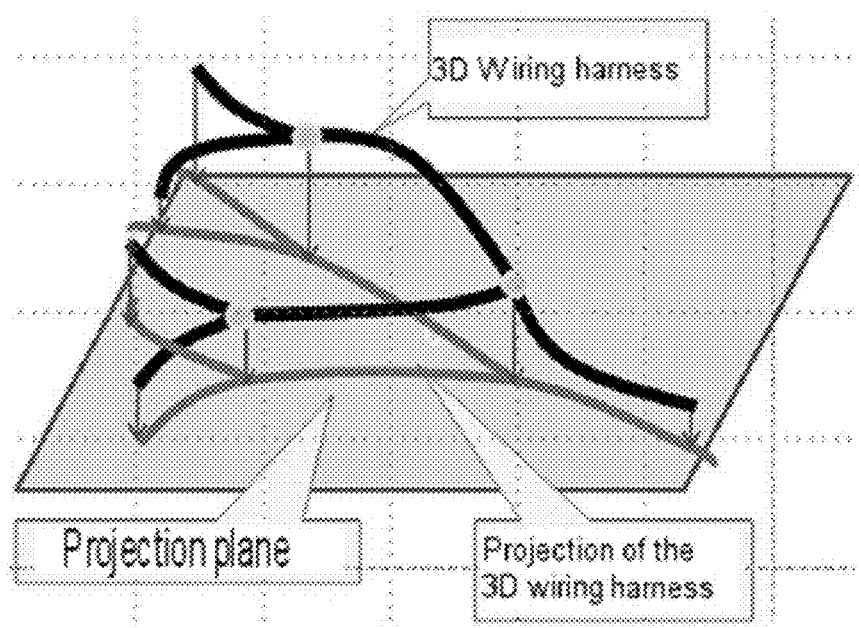
FIG. 1 depicts a graphical representation of the prior art flow approach for generating two-dimensional drawings from three-dimensional wire harness models.
Figure 1:
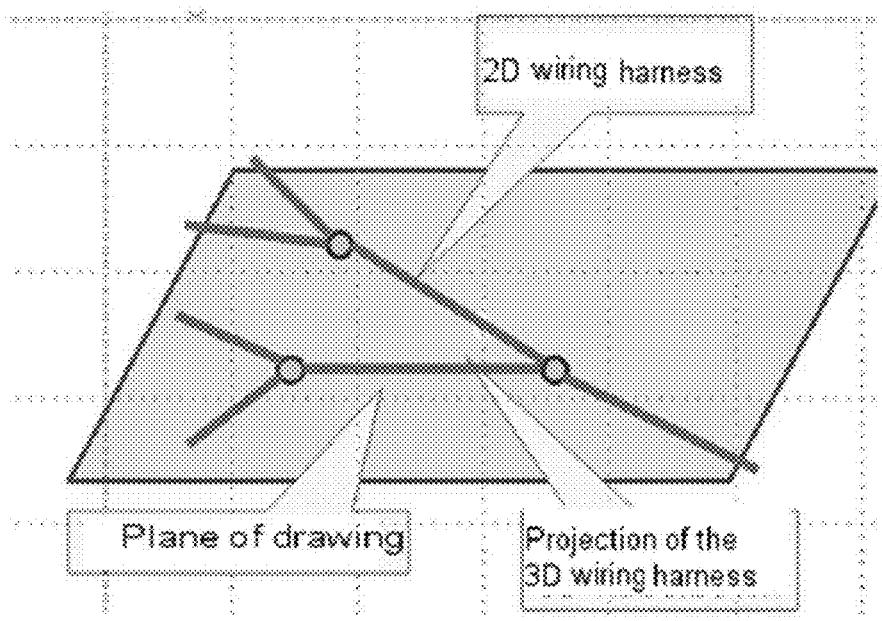

One aspect of the disclosure relates to generating a two-dimensional drawing that incorporates three-dimensional orientation data extracted from a three-dimensional model of the given wire harness.

Another aspect of the disclosure relates to producing a vehicle wire harness based on a formboard drawing generated from the above three-dimension orientation data from the two-dimensional drawing disclosed herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

DETAILED DESCRIPTION

Certain aspects of the invention may be carried out using a computer-based drawing software application, such as the commercially available product LDorado Design, CATIA wiring or Zuken e3.topology. It should be appreciated that such a drawing application that is configured to carry out one or more aspects of the invention may be executed on one or more processor-based computers, servers, databases and any combinations thereof.

Figure 2:
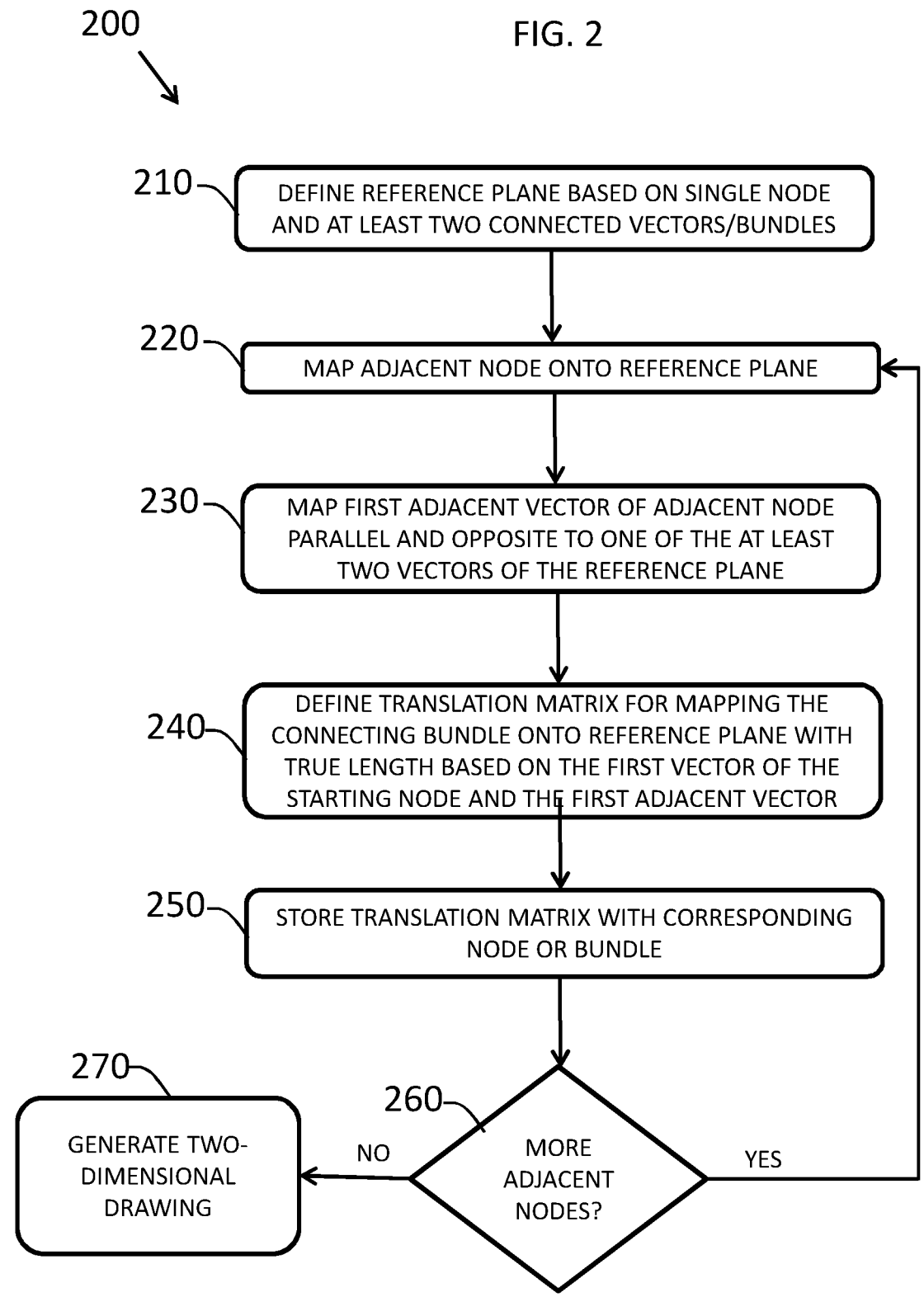
FIG. 2 depicts one embodiment of a process for implementing one or more aspects of the invention.

Referring now to FIG. 2, depicted is one exemplary process for generating a two-dimensional wire harness drawing that incorporates orientation information from a three-dimensional wire harness model. In particular, process 200 begins with a three-dimensional wire harness, such as the one depicted in FIG. 3A, which is comprised of a plurality of nodes and interconnecting bundles.

A "node" is a point of the wire harness where the connections are connected to a control device, sensor, actuator or a splice or the ground (ring terminal) or where one wire bundle is split into two or more.

Additionally, a "bundle" (may also referred to as a "segment") is a section of a topological connection where no intermediate electrical contacts appear. In other words, at the beginning and at the end, the same wires go in and out. Cables and wires are divided in bundles. Every bundle has its own characteristics, such as length, temperature range, etc.

Process 200 begins at block 210 where a reference plane is defined based on a single node selected from the three-dimensional wire harness model, together with at least two 'vectors,' each corresponding to a bundle directly connected to the single node. It should be appreciated that a 'vector' has an origin at a node and a direction corresponding to that of a bundle directly connected to that node. The magnitude of each vector is equal to the real length of the bundle. Moreover, it should be appreciated that, while any node may be selected as the starting node, or first selected node, it may be preferable to select a node disposed along an end or edge of the depicted wire harness.

Regardless of which node is the first selected node, once the reference plane has been defined in the above manner, process 200 moves to block 220 where a node adjacent to the first selected node is mapped onto the previously-defined reference plane. The adjacent node would be directly connected to the first selected node by a given bundle. This mapping may be carried out using a suitable geometric translation which results in the adjacent node being "flattened" onto the reference plane.

Then, at block 230, a first adjacent vector of the adjacent node (corresponding to the bundle connecting the first selected node and the adjacent node) may then be mapped onto the reference plane as well, particularly with an orientation that is parallel and opposite to the vector of the first selected node corresponding to the bundle directly connecting the first selected node with the adjacent node.

Since the aforementioned first adjacent vector of the adjacent node corresponds to the same connecting bundle as one of the vectors from the first selected node, the translation of the adjacent node's vector onto the reference plane defines a translation matrix for mapping the connecting bundle itself onto the reference plane with its true length (block 240). That is, the translation matrix is defined as the geometric difference between the connecting bundle's actual three-dimensional position and orientation, and its two-dimensional position and orientation after being flattened to the reference plane.

At block 250, the defined translation matrix may then be stored or otherwise associated with the corresponding bundle and/or with the connected node (e.g., the adjacent node).

Thereafter, at block 260, a determination is made as to whether there are any additional nodes adjacent either to the first selected node or to the previously-translated adjacent node. If so, process 200 returns to block 220 where that additional adjacent node is then similarly mapped onto the reference plane. This loop (220-260) continues until it is determined at block 260 that all of the nodes and bundles of the three-dimensional wire harness model have been translated to the reference plane.

At that point, process 200 continues to block 270 where a two-dimensional drawing of the aforementioned three-dimensional wire harness model may be generated. The two-dimensional drawing may be generated in this fashion with a computer-based drawing software tool, but notably would incorporate not only the geometric information about the nodes and bundles of the three-dimensional wire harness model, but would also include three-dimensional orientation data from a three-dimensional model of the given wire harness by virtue of the variously stored translation matrices, as described above.

After the two-dimensional drawing is generated, the drawing may be published and provided to one or more suppliers for feasibility testing. The drawing may be published in the native data format of the generating tool (e.g LDorado Design or Mentor Graphics harness XC, or in a neutral Standard format like VDA KBL (harness list) or VEC (Vehicle Electric Container) as a xml-file) for manipulating it in a post-process or in a tif format (for long time archival storage). After any necessary modifications that are identified during the testing process, the final two-dimensional drawing may be published for the subsequent approval process.

Figure 3A:
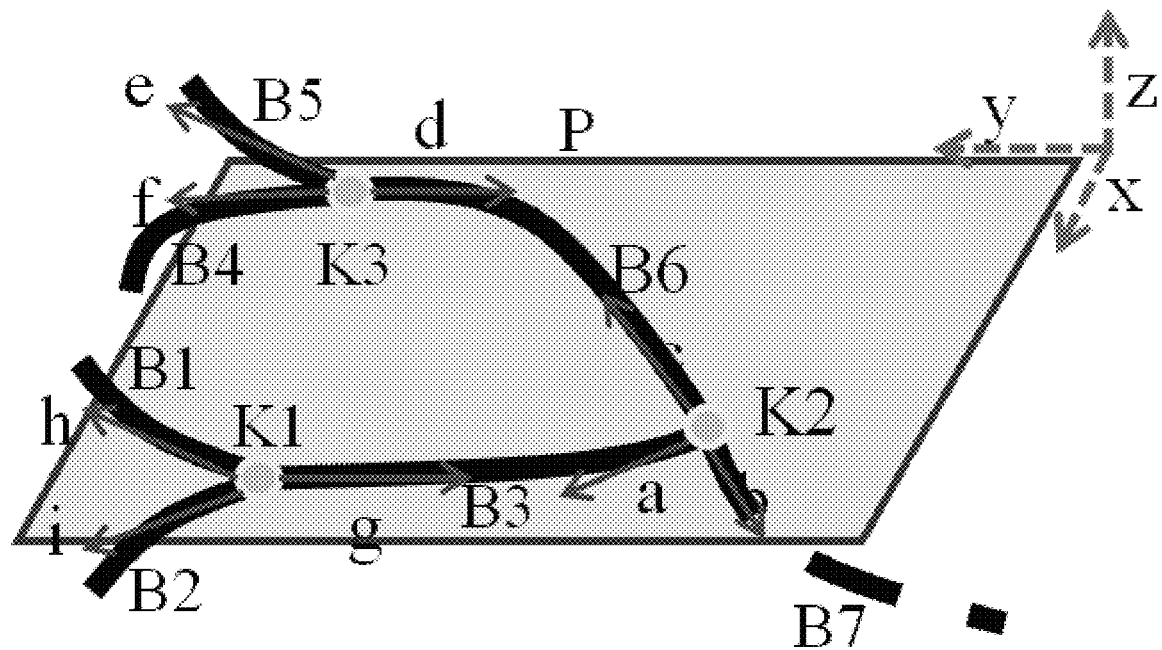
FIGS. 3A-3B depicts a graphical representation of a novel approach for generating two-dimensional drawings from three-dimensional wire harness models, in accordance with the principles of the invention.
Figure 3B:
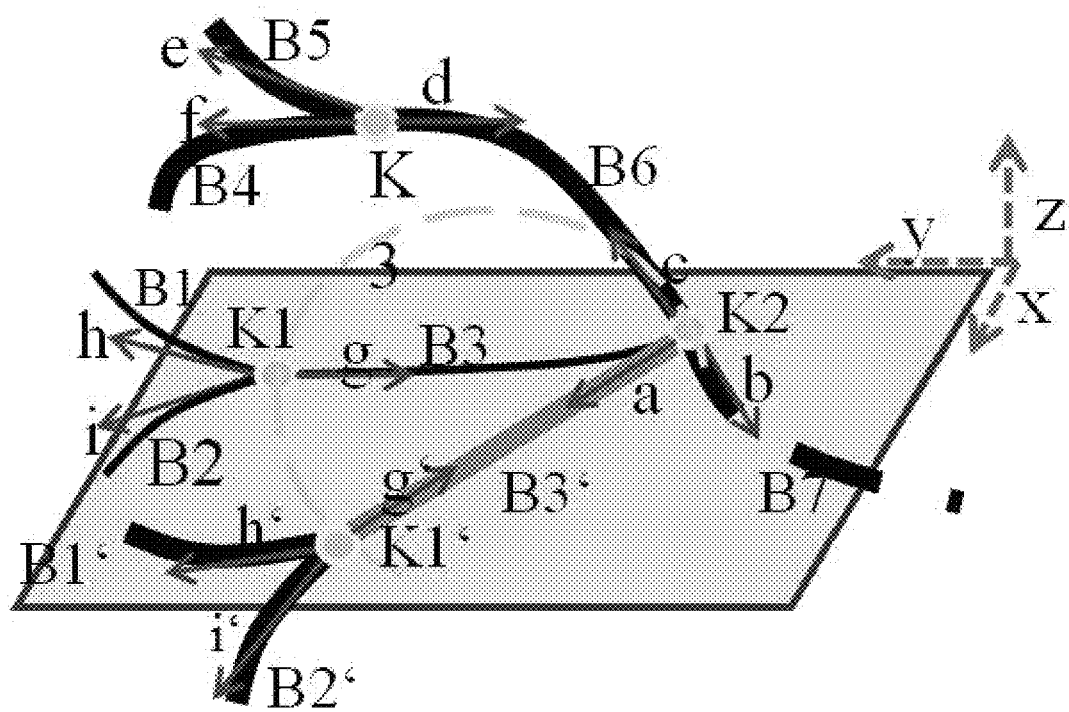

FIGS. 3A-3B provide a graphical depiction of the process 200 described above. Beginning with FIG. 3A, depicted is a three-dimensional wire harness model comprising nodes K1-K3 and bundles B1-B7, where each of the bundles B1-B7 can each be represented by two vectors (a-i).

In the particular example of FIGS. 3A-3B, node K2 has been selected as the first selected node. Node K2, together with two adjacent vectors, a and b, are taken together to define reference plane P (per block 210 of FIG. 2). It should of course be appreciated that a different node and/or different vectors may have been selected to define the reference plane.

Adjacent node K1 is then mapped onto reference plane P, and is shown in FIG. 3B as mapped node K1' (per block 220 of FIG. 2). As shown in FIG. 3A, K1 is an adjacent node to the first selected node K2 by virtue of being directly connected thereto by bundle B3.

The vector g of adjacent node K1 (corresponding to bundle B3) may then be mapped onto the reference plane P as well, shown in FIG. 3B as mapped vector g', particularly with an orientation that is parallel and opposite to the vector a of the first selected node K2 which corresponds to the bundle B3 connecting K1 and K2 (per block 230 of FIG. 2). Note that neither node K2 nor vectors a and b have been translated in FIG. 3B since they were used to define the reference plane P in the first instance.

Since the vector g of node K1 corresponds to the same connecting bundle B3 as one of the vector a of node K2, the translation of vector g to g' onto the reference plane P defines a translation matrix for mapping the connecting bundle B3 itself onto the reference plane P with its true length (per block 240 of FIG. 2). The result of mapping bundle B3 in this fashion is shown in FIG. 3B where mapped bundle B3' is shown between mapped node K1' and K2 (already within reference plane P).

The resulting translation matrix for bundle B3 can then be stored with or otherwise associated with the translated bundle B3' and/or translated node K1' (per block 250 of FIG. 2).

Continuing to refer to FIG. 3B, it should further be noted that bundles B1 and B2 are depicted as similarly being translated, in an iterative basis as described above with reference to FIG. 2, onto the reference plane P as bundles BF and B2', respectively. This process would continue until the remaining nodes B3-B7 have been similarly translated onto the reference plane P, and the resulting translation matrices stored with the corresponding translated bundles and/or nodes.

Once the two-dimensional drawing of the three-dimensional wire harness model has been generated, the fact that all three-dimensional bundle orientation data has been preserved and stored within the two-dimensional drawing itself means that the drawing can be used directly in the wire harness production process without having to undergo the tedious task of unwinding the bundles, as has been required to this point.

Figure 4:
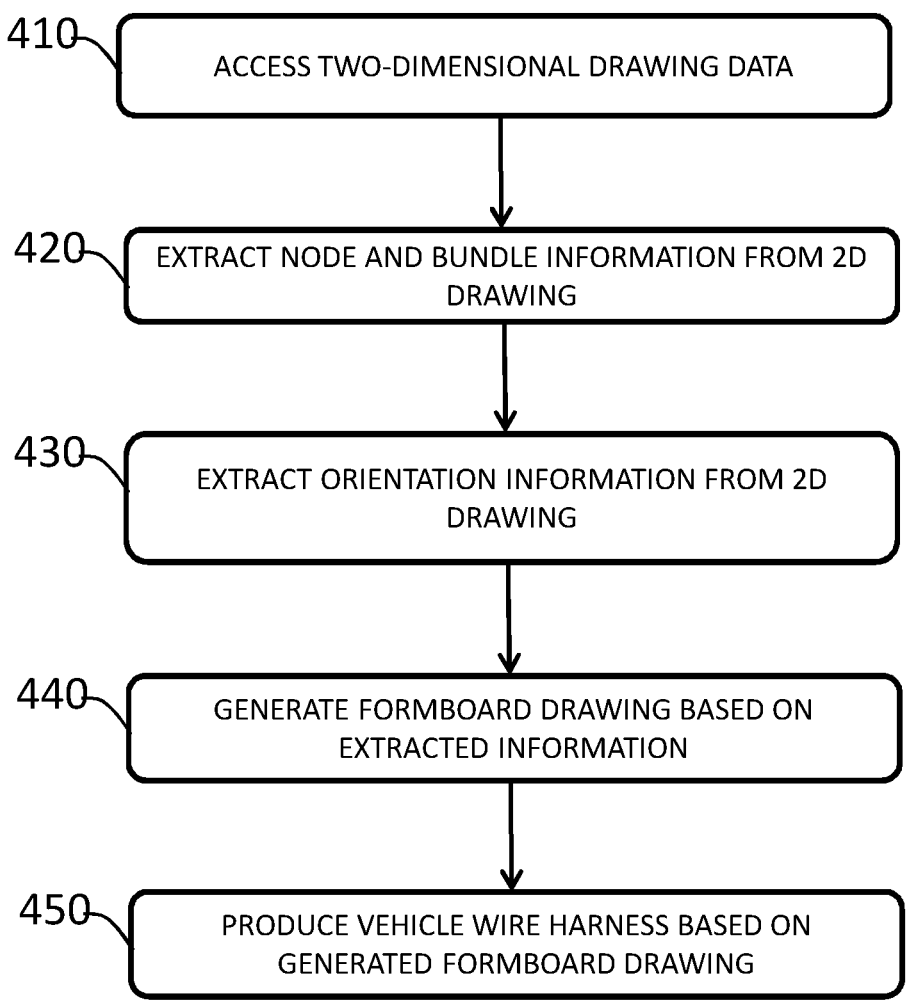
FIG. 4 depicts one embodiment of a process for implementing one or more additional aspects of the invention.

To that end, FIG. 4 depicts one embodiment of a process by which the inventive two-dimensional drawing of the present invention may be directly used in the production of a vehicle wire harness. Specifically, process 400 begins at block 410 with the two-dimensional drawing data being accessed by, for example, a computer drawing authoring software application.

Once accessed, node and bundle information, including true bundle length, may be extracted from the two-dimensional drawing at block 420. Moreover, unlike the prior art, three-dimensional bundle orientation information may be similarly extracted from the two-dimensional drawing (block 430).

The above information extracted information may then be used to directly generate a formboard drawing without the tedious and manual process of unwinding or disentangling the wire harness bundles (block 440). Thereafter, a vehicle wire harness may be produced based, at least in part, on the formboard drawing that was generated directly from the above two-dimensional drawing.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A computer-implement method for generating a two-dimensional drawing of a three-dimensional vehicle wire harness model, wherein the three-dimensional vehicle wire harness model comprises a plurality of nodes interconnected by a plurality of bundles; the method comprising the acts of:

selecting a starting node from the plurality of nodes of the three-dimensional vehicle wire harness model, wherein the starting node is directly connected to a first bundle and a second bundle of the plurality of bundles, wherein further each of the first and second bundles are representable by corresponding first and second vectors;

defining a reference plane based on an orientation of the starting node, the first vector and the second vector;

mapping a first adjacent node onto the reference plane by geometric translation, wherein the first adjacent node is adjacent to and directly connected to the starting node by the first bundle;

mapping a first adjacent vector by geometric translation onto the reference plane with an orientation that is parallel and opposite to the first vector, wherein the first adjacent vector corresponds to the first bundle;

wherein the first bundle is mapped to the reference place with its true length by virtue of being represented on the reference plane by the first vector of the starting node and the mapped first adjacent vector of the mapped first adjacent node;

storing a translation matrix, corresponding to said mapping of the first bundle, in association with at least one of the mapped first adjacent node and the mapped first bundle;

repeating mapping operations until each of the plurality of nodes and the plurality of bundles have been mapped, by geometric translation, to the reference plane, and wherein corresponding translation matrices are stored in association with corresponding ones of at least one of the plurality of mapped nodes and the plurality of mapped bundles;

generating the two-dimensional drawing of the three-dimensional vehicle wire harness model, wherein the two-dimensional drawing comprises three-dimensional orientation data from the translation matrices corresponding to said plurality of bundles; and using the generated two-dimensional drawing in a wire harness production process.

2. The computer-implement method of claim 1, wherein the plurality of nodes includes one or more control devices, sensors, actuators, splices, and ring terminal points.

3. The computer-implement method of claim 1, wherein each of the plurality of bundles comprises a topological connection with no intermediate electrical contacts.

4. The computer-implement method of claim 1, wherein an origin of the first vector is the starting node and wherein a direction of the first vector correspond to a direction of the first bundle; and an origin of the second vector is the starting node and wherein a direction of the second vector correspond to a direction of the second bundle.

5. The computer-implement method of claim 4, wherein an origin of the first adjacent vector is the first adjacent node and wherein a direction of the first adjacent vector correspond to a direction of the first bundle in a parallel and opposite fashion as the first vector.

6. The computer-implement method of claim 1, wherein said geometric translation comprise a flattening with respect to the reference plane.

7. The computer-implement method of claim 1, wherein the translation matrix corresponding to the first bundle is defined as a geometric difference between the first bundle's actual position and orientation in the three-dimensional vehicle wire harness model, and the first bundle's two-dimensional position and orientation after being mapped onto the reference plane.

8. The computer-implement method of claim 1, further comprising generating a formboard drawing directly from the two-dimensional drawing.

9. The computer-implement method of claim 1, wherein the two-dimensional drawing further includes three-dimensional orientation data about each of the plurality of nodes and plurality of bundles of the three-dimensional vehicle wire harness model.

10. A computer program product, comprising:

a non-transitory processor readable medium having processor executable code embodied therein to generate a two-dimensional drawing of a three-dimensional vehicle wire harness model, wherein the three-dimensional vehicle wire harness model comprises a plurality of nodes interconnected by a plurality of bundles, the non-transitory processor readable medium having:

processor executable program code to select a starting node from the plurality of nodes of the three-dimensional vehicle wire harness model, wherein the starting node is directly connected to a first bundle and a second bundle of the plurality of bundles, wherein further each of the first and second bundles are representable by corresponding first and second vectors;

processor executable program code to define a reference plane based on an orientation of the starting node, the first vector and the second vector;

processor executable program code to map a first adjacent node onto the reference plane by geometric translation, wherein the first adjacent node is adjacent to and directly connected to the starting node by the first bundle;

processor executable program code to map a first adjacent vector by geometric translation onto the reference plane with an orientation that is parallel and opposite to the first vector, wherein the first adjacent vector corresponds to the first bundle, wherein the first bundle is mapped to the reference place with its true length by virtue of being represented on the reference plane by the first vector of the starting node and the mapped first adjacent vector of the mapped first adjacent node;

processor executable program code to store a translation matrix, corresponding to said mapping of the first bundle, in association with at least one of the mapped first adjacent node and the mapped first bundle;

processor executable program code to repeat mapping operations until each of the plurality of nodes and the plurality of bundles have been mapped, by geometric translation, to the reference plane, and wherein corresponding translation matrices are stored in association with corresponding ones of at least one of the plurality of mapped nodes and the plurality of mapped bundles;

processor executable program code to generate the two-dimensional drawing of the three-dimensional vehicle wire harness model, wherein the two-dimensional drawing comprises three-dimensional orientation data from the translation matrices corresponding to said plurality of bundles; and processor executable program code that causes the generated two-dimensional drawing to be used in a wire harness production process.

11. The computer program product of claim 10, wherein the plurality of nodes includes one or more control devices, sensors, actuators, splices, and ring terminal points.

12. The computer program product of claim 10, wherein each of the plurality of bundles comprises a topological connection with no intermediate electrical contacts.

13. The computer program product of claim 10, wherein
   an origin of the first vector is the starting node and wherein a direction of the first vector correspond to a direction of the first bundle; and
   an origin of the second vector is the starting node and wherein a direction of the second vector correspond to a direction of the second bundle.

14. The computer program product of claim 13, wherein an origin of the first adjacent vector is the first adjacent node and wherein a direction of the first adjacent vector correspond to a direction of the first bundle in a parallel and opposite fashion as the first vector.

15. The computer program product of claim 10, wherein said geometric translation comprise a flattening with respect to the reference plane.

16. The computer program product of claim 10, wherein the translation matrix corresponding to the first bundle is defined as a geometric difference between the first bundle's actual position and orientation in the three-dimensional vehicle wire harness model, and the first bundle's two-dimensional position and orientation after being mapped onto the reference plane.

17. The computer program product of claim 10, further comprising processor executable program code to generate a formboard drawing directly from the two-dimensional drawing.

18. The computer program product of claim 10, wherein the two-dimensional drawing further includes three-dimensional orientation data about each of the plurality of nodes and plurality of bundles of the three-dimensional vehicle wire harness model.

* * * * *